No. 801,965. PATENTED OCT. 17, 1905.
W. A. BERNARD.
DIVIDERS.
APPLICATION FILED JULY 18, 1904.
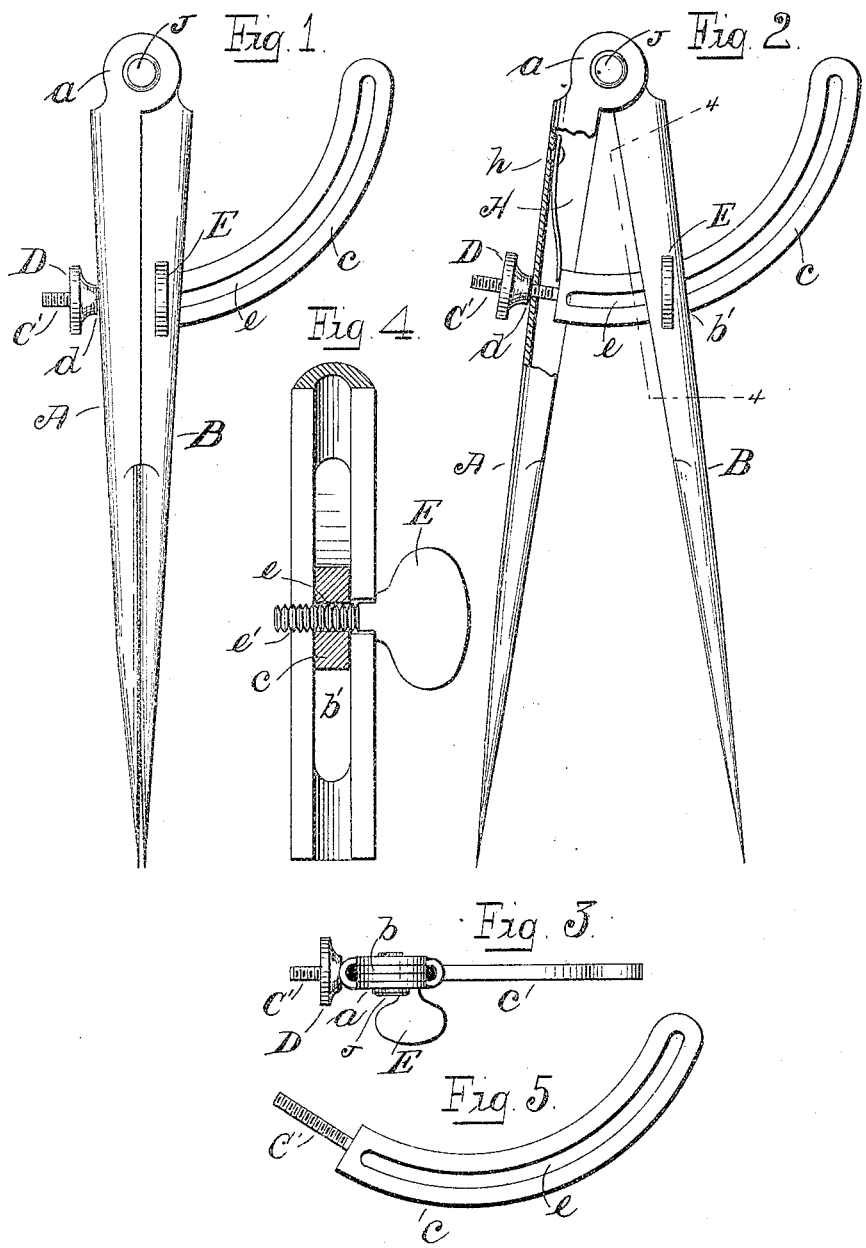

UNITED STATES PATENT OFFICE.

WILLIAM A. BERNARD, OF NEW HAVEN, CONNECTICUT, ASSIGNOR TO THE WILLIAM SCHOLLORN COMPANY, OF NEW HAVEN, CONNECTICUT, A CORPORATION OF CONNECTICUT.

DIVIDERS.

No. 801,965.  Specification of Letters Patent.  Patented Oct. 17, 1905.

Application filed July 18, 1904. Serial No. 216,993.

*To all whom it may concern:*

Be it known that I, WILLIAM A. BERNARD, of the city and county of New Haven, in the State of Connecticut, have invented new and useful Improvements in Dividers, of which the following is a full, clear, and exact description when taken in connection with the accompanying drawings, which form a part thereof, and in which—

Figure 1 represents a side elevation of the dividers; Fig. 2, a similar view, partly broken away, (the dividers shown expanded;) Fig. 3, a top view; Fig. 4, a transverse vertical section on lines 4 4 of Fig. 2, and Fig. 5 a detail side view of the wing.

In all figures similar letters of reference represent like parts.

This invention relates to improvements in dividers, calipers, compasses, and similar instruments of precision; and it consists in the production of a light, strong, and inexpensive instrument capable of peculiarly nice adjustment and having the various improvements and combinations of parts set forth and claimed hereinafter.

Referring to the drawings, the parts designated by the letters A and B represent the legs of the dividers, of which the upper portions are made U-shaped (in cross-section) and terminate in disks $a$ and $b$ at their extreme upper ends. The lower portions are circular and taper to a point, as in the ordinary form of dividers. The disks upon one of the legs lie against and in contact with each other, and the disks of the other leg inclose the inner disks, Fig. 3. The legs A and B are joined by means of a swivel J, inserted through the disk-shaped ends of said legs. By thus forcing together the disk-shaped sides of one leg and inclosing them by the disk-shaped sides of the other leg a washer is thereby dispensed with and the rigidity of the instrument materially increased.

An arc-shaped wing C, with a curved longitudinal slot $e$, has a screw-threaded lug C'' formed at one end and made integral therewith, which may be inserted through the hole $d$ in the leg A. The screw-threaded lug may carry a thumb-nut D, adapted to bear against the outer surface of the leg A. The back of the leg B is longitudinally slotted at $b'$ in order to allow the arc-shaped wing C to pass through the slot thus made between the sides of the leg. The sides of the leg B may be locked upon the wing C by means of the thumb-screw E, which passes through one of the sides of the leg, through the slot $e$ in the wing C, and by means of a screw-thread $e'$ is adapted to enter the other side of the leg and engage the screw-thread therein. The sides of the leg B being flexible the legs are readily locked in any position by tightening the thumb-screw, and thus causing the sides of the leg B to grip the wing C.

Housed in the leg A and bearing on the inner side of the leg and the end of the wing C is a flat spring H, which forces the wing as far from the leg as the nut D on the screw C' will permit.

The leg B having been locked upon the wing C, a nice adjustment at any angle may be obtained by turning the thumb-nut D on the screw C against the tension of the spring H. The spring H is held in place in the leg A by a rivet $h$ passing through the back of the leg.

The adjustment feature being entirely independent of the rest of the instrument may be withdrawn when it is desirable to do so without impairing the strength or rigidity of the instrument.

Having now described my invention, what I claim, and desire to secure by Letters Patent, is—

1. In dividers or similar articles, the combination with a pair of legs U-shaped in cross-section; of a wing; a screw attached to one end of the wing and projecting through one leg; a nut mounted on said screw and adapted to limit the movement of one of said legs; and means for drawing the flexible parallel sides of the other U-shaped leg toward each other and bind on said wing and limit the movement of the leg substantially as described.

2. In dividers, or similar articles, the combination with a pair of legs U-shaped in cross-section, one of said legs having a longitudinal slot in the back thereof; of a removable wing extending through said slot between the sides of said leg, and having its inner end housed within the hollow interior of the other leg; a spring within said leg normally tending to separate said leg and wing; means for drawing said wing and leg together; a longitudinal slot in said wing; and a screw projecting through said slot and engaging the flexible sides of the U-shaped leg to bind said wing, substantially as described.

3. In dividers, or similar articles, the combination of a pair of legs U-shaped in cross-section, one of said legs having a longitudinal slot and the other a perforation; a removable wing extending through said longitudinal slot, and having a screw at the end thereof, projecting through said perforation; a spring housed within said perforated leg, normally tending to separate said leg and wing; a nut on said screw to limit the movement of said leg and wing; and a further screw on said slotted leg projecting through a slot in said wing, and engaging the two sides of said leg to bind them against said wing, substantially as described.

4. In dividers, or similar articles, the combination with a pair of legs U-shaped in cross-section, and provided at their upper ends with integral disks, the disks of one of the legs lying against each other, and the disks of the other offset to embrace said inner disks; and a fulcrum-pin extending through said disks, substantially as described.

In witness whereof I have hereunto set my hand on the 15th day of July, 1904.

WILLIAM A. BERNARD.

Witnesses:
WILLIAM R. PITKIN,
SAMUEL H. FISHER.